B. E. WILLETT.
DISPLAY RACK.
APPLICATION FILED JULY 15, 1919.
1,345,525. Patented July 6, 1920.
5 SHEETS—SHEET 1.
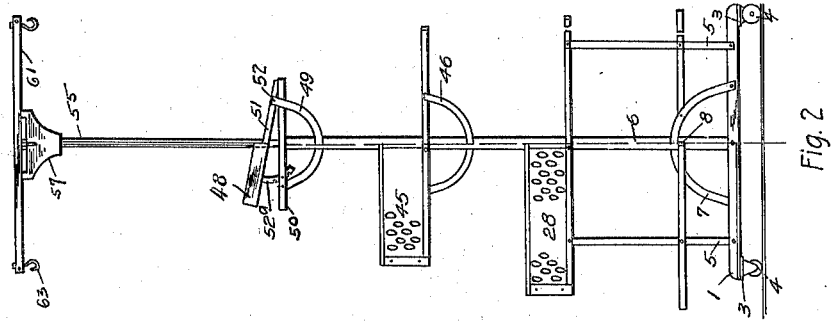
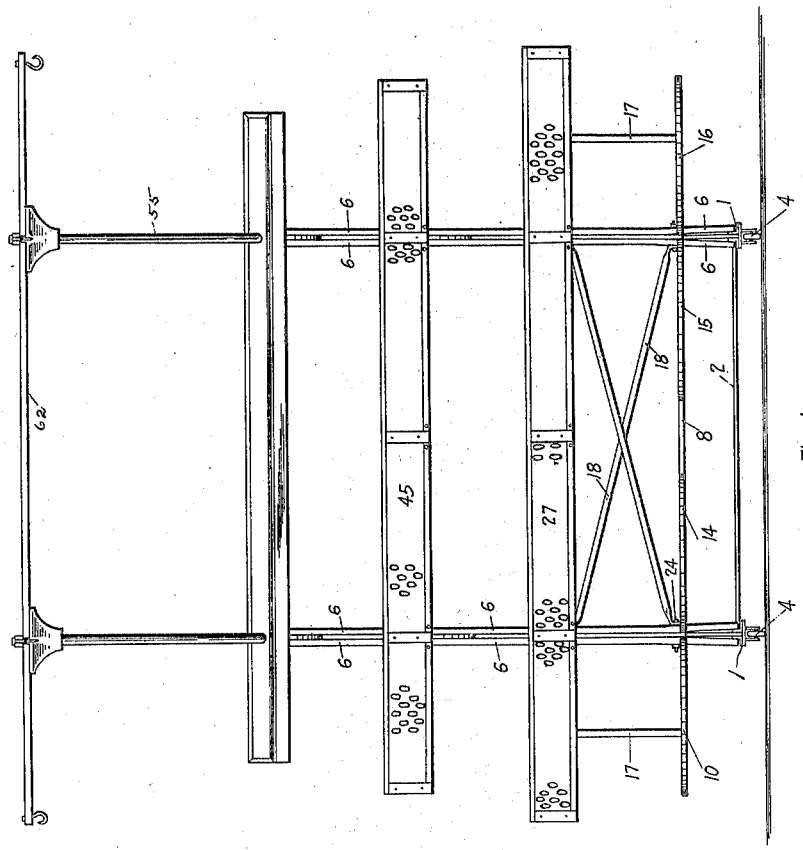
INVENTOR.
Benedict E. Willett,
BY Howard P. Smith,
His ATTORNEY.
WITNESSES:

B. E. WILLETT.
DISPLAY RACK.
APPLICATION FILED JULY 15, 1919.
1,345,525.
Patented July 6, 1920.
5 SHEETS—SHEET 2.
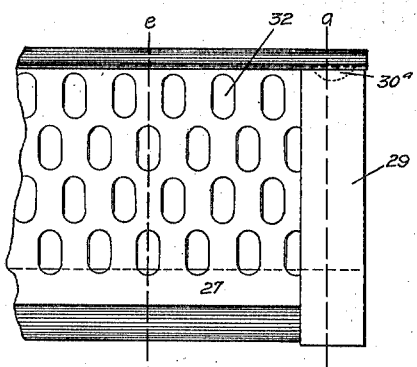
Fig. 3
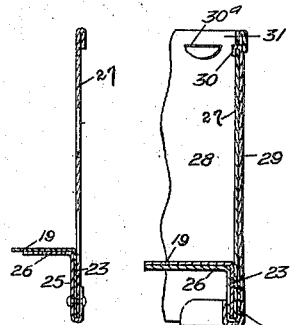
Fig. 26  Fig. 4
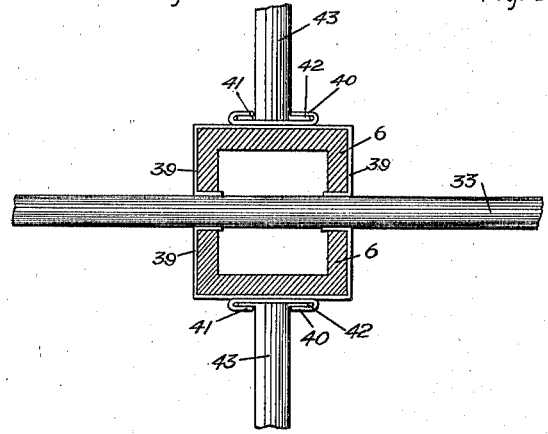
Fig. 5
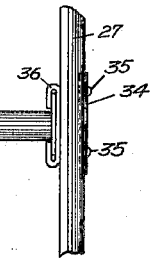
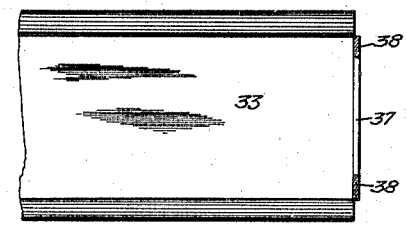
Fig. 6
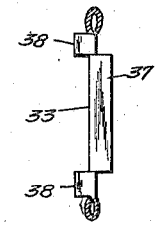
Fig. 7

B. E. WILLETT.
DISPLAY RACK.
APPLICATION FILED JULY 15, 1919.

1,345,525.

Patented July 6, 1920.
5 SHEETS—SHEET 3.

WITNESSES:

INVENTOR.
Benedict E. Willett,
BY Howard D. Smith,
ATTORNEY.

B. E. WILLETT.
DISPLAY RACK.
APPLICATION FILED JULY 15, 1919.
1,345,525.
Patented July 6, 1920.
5 SHEETS—SHEET 4.
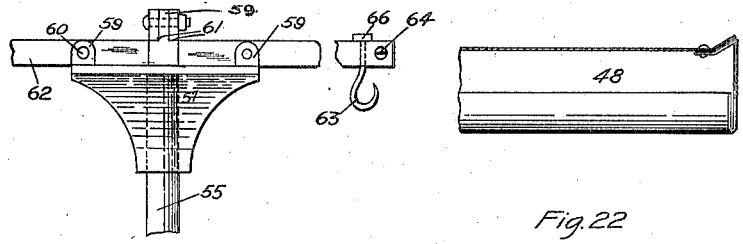
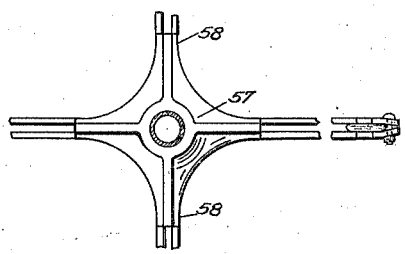
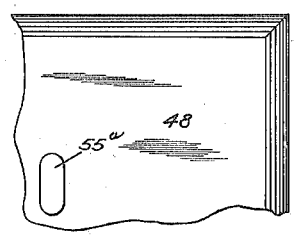
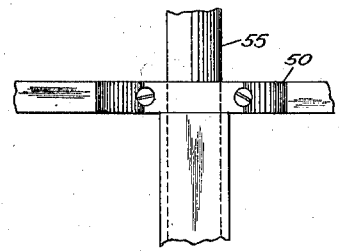
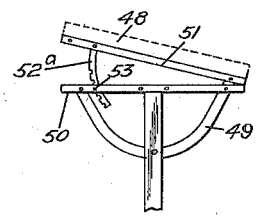
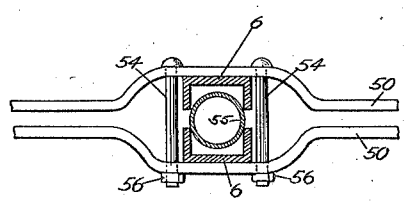
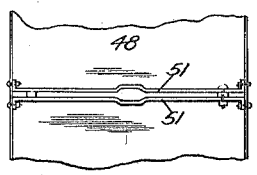
WITNESSES:
INVENTOR.
Benedict E. Willett,
BY
ATTORNEY.

UNITED STATES PATENT OFFICE.

BENEDICT E. WILLETT, OF NEAR DAYTON, OHIO.

DISPLAY-RACK.

1,345,525.   Specification of Letters Patent.   Patented July 6, 1920.

Application filed July 15, 1919. Serial No. 310,990.

*To all whom it may concern:*

Be it known that I, BENEDICT E. WILLETT, a citizen of the United States, residing near the city of Dayton, in the county of Montgomery and State of Ohio, have invented certain new and useful Improvements in Display-Racks, of which the following is a specification.

This invention relates to new and useful improvements in display racks.

The principal object of the invention is to provide a simple, durable and efficient rack for holding and displaying vegetables, fruit and other articles in positions where they are readily accessible to the clerk or customer. The invention contemplates the provision of a combined basket, tray and banana holding rack in which the trays may be made tiltable and from which the banana supporting devices may be readily removed. The compactness of the device conserves space in a store, the basket holders being under the trays and the banana supporting arms above the latter.

It has been another object of the invention to add strength to simplicity of construction, with the result that articles of great weight may be supported by the device without subjecting its parts to undue strains.

Other important and incidental objects will be brought out in the following specification and particularly set forth in the subjoined claims.

Figure 8:
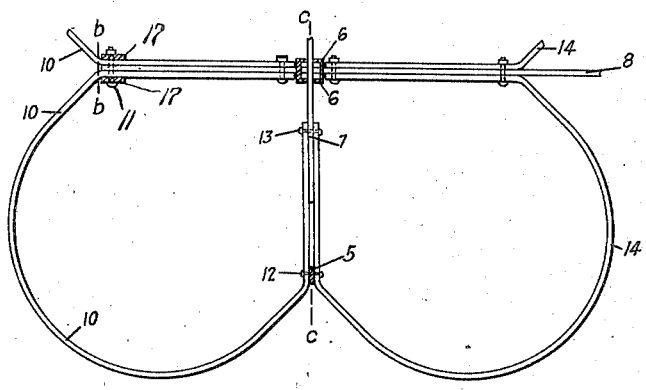
Figure 9:
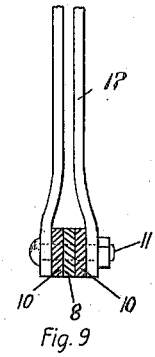
Figure 10:
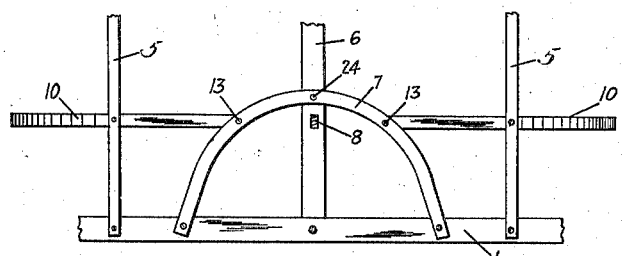
Figure 11:
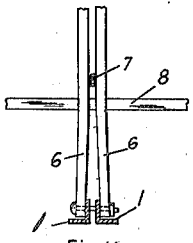
Figure 12:
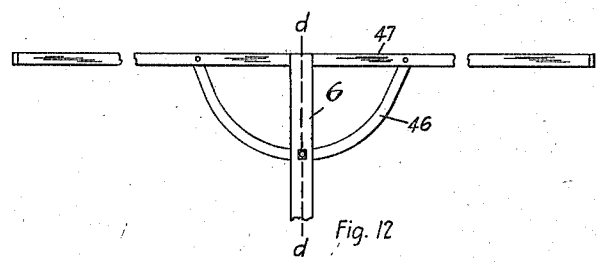
Figure 13:
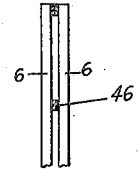
Figure 14:
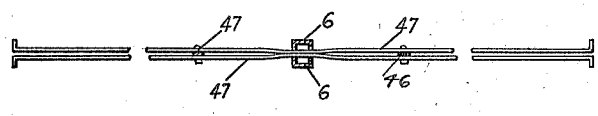
Figure 23:
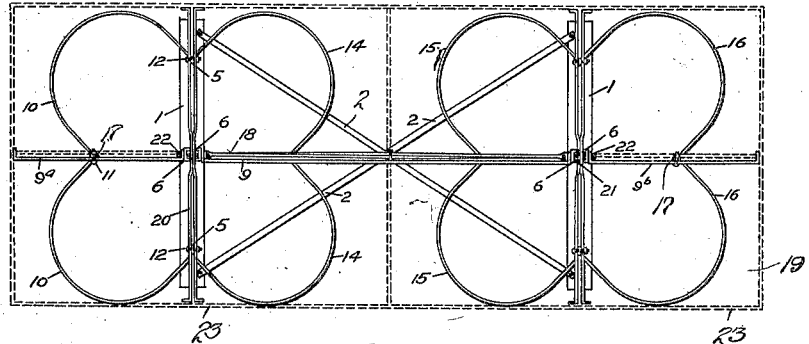
Figure 24:
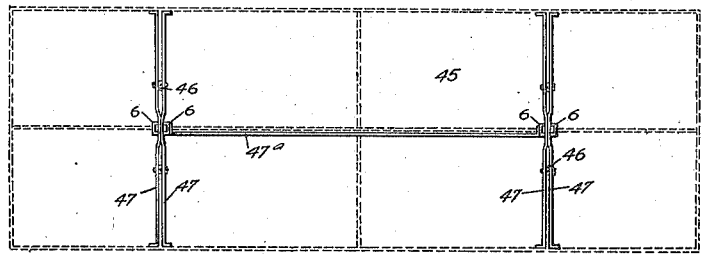
Figure 25:
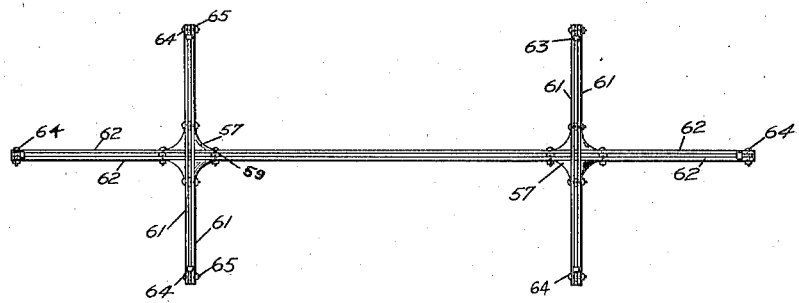

The preferred form of embodiment of my invention is illustrated in the accompanying drawings, of which Figure 1 is a side elevational view of my improved display rack. Fig. 2 is an end elevation of the same. Fig. 3 is a side elevational view of an end portion of one of the trays. Fig. 4 is a section taken on the line *a—a* of Fig. 3, showing how the bottom and side portion of a tray are connected. Fig. 5 is a top plan view, partly in section, of a tray partition and supporting means. Fig. 6 is a side elevational view of a portion of one of the tray partitions. Fig. 7 is an end view thereof. Fig. 8 is a plan view of two of the basket holders. Fig. 9 is a section taken on the line *b—b* of Fig. 8, showing one of the basket holder supporting-bars. Fig. 10 is a vertical section taken on the line *c—c* of Fig. 8. Fig. 11 is an end view of a pair of channel members supported by the base members. Fig. 12 is a side elevational view of the tray bracing means. Fig. 13 is a vertical section taken on the line *d—d* of Fig. 12. Fig. 14 is a top plan view of the tray bracing means. Fig. 15 is a side elevational view of one of the removable banana supporting devices. Fig. 16 is a top plan view of one of the supports for the arms on which the banana bunches are hooked. Fig. 17 is a side elevational view of the clamping means which receive the vertical bars of the banana supporting devices. Fig. 18 is a top plan view of said clamping means. Fig. 19 is a bottom plan view of the tilting tray support. Fig. 20 is a side elevational view of the latter. Fig. 21 is a top plan view of a portion of one of the tilting trays. Fig. 22 is a longitudinal section taken through the latter. Fig. 23 is a top plan view of the lower tray support. Fig. 24 is a bottom plan view of the middle tray support. Fig. 25 is a top plan view of the banana holding frame. And Fig. 26 is a section taken on the line *e—e* of Fig. 3.

Throughout the specification and drawings, similar reference characters denote corresponding parts.

Referring to the accompanying drawings, the display rack is supported by a spider which consists of two runners 1, 1, connected by cross members 2, 2, that cross each other in scissor fashion. Each runner 1 is made up of two angle irons connected at their ends by a bracket member 3 which receives a roller 4. Each pair of angle irons is arranged to present two oppositely disposed upturned flanges for the purpose of tightly receiving between them a pair of vertical bars 5 which are bolted between said flanges, one near one end, and the other near the other end, of its respective runner.

Straddling the upturned flanges of each pair of angle irons, at the middle portion of the runners which the latter form, are the lower ends of a pair of vertically disposed channel members 6, 6, that are firmly bolted to said flanges. Between each pair of channel members 6, 6, there passes the top portion of an arch shaped bracing member 7 whose lower ends are firmly bolted between the upturned flanges of the angle irons of its respective runner 1. (See Figs. 2 and 10.)

Projecting through a preferably square hole in each pair of channel members 6, 6, below the middle top portions of the arch-shaped bracing members 7, is a central horizontal bracing bar 8 that not only firmly braces the rack, but forms a central support for the basket holders soon to be described. (See Figs. 1, 8 and 10. The above elements provide a strong and durable support for the superstructure now to be described.

The channel members 6, 6, project upwardly a sufficient distance to support the number of trays desired. The central support for the first or lower tray is a horizontal member 9 and auxiliary horizontal members 9ª and 9ᵇ, one on each side of the member 9. Below the first tray are provided the following described holders for baskets containing articles such as potatoes, corn, etc.

Bolted to the left end of the horizontal bracing member 8 is a pair of basket holding elements or bands 10, the inner ends of the latter terminating near the channel members 6, 6. They then project outwardly, one on each side of the horizontal member 8, to a securing bolt 11 provided in the end of the latter, from which they are bowed to bolts 12 that secure them to the vertical bars 5, from which they extend inwardly to the arch-shaped members 7 to which they are connected by bolts 13. In a like manner a pair of similar basket holding bands 14 are connected to the horizontal bracing bar 8, vertical bars 5 and arch shaped members 7, on the right side of the left hand pair of channel members 6, 6. (See Figs. 1 and 8.) On each side of the right hand pair of channel members 6, 6, there is secured to the bracing member 8, vertical bars 5 and arch-shaped members 7, in the manner above described, a pair of basket holding bands, the pair on the left of the channel members 6, 6, being designated by the numeral 15 and the one on the right of said channel members by the numeral 16. The bands 15 and 16 are similar to the bands 10 and 14 above described.

The strength of the supporting structure for the basket holding bands 10, 14, 15 and 16 is enhanced by the provision of two vertical suspension bars 17 that are secured to the bolts 11 at the ends of the bracing bar 8, the lower ends of said bars curving outwardly and downwardly to straddle the basket holding bands, and portion of the member 8 between them, as shown in Fig. 9. The upper end of one vertical suspension bar 17 is secured to the horizontal member 9ª, while the upper end of the other vertical suspension bar 17 is secured to the horizontal member 9ᵇ. A pair of interior vertically disposed bracing elements 18 that cross each other in scissor fashion at their middle portions, are firmly secured between the inner channel members 6, 6, (see Fig. 1).

Heavily laden baskets may be placed upon the bands just described, with the result that the latter will not only firmly hold the baskets, but will prominently display their contents to the customer.

The tray portions of my improved rack, for holding and displaying small articles such as lemons, apples, etc., will now be described. The lowermost tray, or the one directly above the basket holders, has a preferably rectangular bottom 19 which is supported by the horizontal members 9, 9ª and 9ᵇ and cross supports 20 and 21. Each cross support comprises a pair of horizontal bars whose middle portions pass between their respective channel members 6, 6, to which they are firmly secured by bolts 22. The outer ends of the cross supporting bars 20 are bolted to the left hand vertical members 5, 5, while the outer ends of the cross supporting bars 21 are bolted to the right hand vertical members 5, 5. (See Fig. 23.)

The horizontal member 9 terminates at each end in a right-angled portion which is firmly connected to a respective inner channel member 6 by one of the bolts 22. Likewise, the horizontal member 9ª has a right angled portion at each end, the inner end portion being secured to its respective channel member 6 by one of the bolts 22, while its outer right angled end has bolted thereto the downwardly projecting flange portion 23 on one end of the tray bottom 19. Provided on the opposite end of the tray bottom 19 is a similar flange 23 to which is bolted the right angled outer end portion of the horizontal bar 9ᵇ, the inner right-angled end portion of the latter being connected to its respective channel member by one of the bolts 22 as shown in Fig. 23.

The bracing elements 18, 18, also have right-angled foot portions, the upper foot portions of which are connected to the channel members 6, 6, by the bolts 22, while their lower ends are connected to said channel members by bolts 24. (See Figs. 1 and 23.)

It will also be observed that the cross supporting bars 20 and 21 terminate at their outer ends in right angled portions to which the downwardly projecting flange portions 23 of the sides of the tray bottom 19 are bolted. (See Fig. 23.)

Referring to Figs. 3, 4 and 26, the side and end flanges 23 of the bottom 19 of the lowermost tray project downwardly into a groove or pocket formed by flat side and end marginal pieces 25. These pieces have a horizontal portion 26 upon which a portion of the tray bottom 19 rests, and a portion hook-shaped in cross section to provide the groove or recess that receives not only the flange portion 23 of the bottom 19 of the tray, but also the bottom edges of the side members 27 and end members 28 of the latter.

The side members 27 and end members 28 of the tray, are firmly secured together at their ends by corner pieces 29 having two right-angled faces and whose upper ends 30 project through slots 30ª provided in the upper marginal edges 31 of said side and end members of the tray. These ends 30, which are formed to enter said slots, are bent downwardly on the inside of said side and end members after passing through the slots, to provide a firm connection between them without the use of screws or rivets. The lower ends of the corner pieces 29 are bent to hook over the lower hook-shaped ends of the marginal pieces 26, as shown in Fig. 4. The means just described firmly and neatly connect the sides, ends and bottom of the tray firmly together without the use of numerous screws and rivets that are difficult to apply and remove.

The side members 27 and end members 28 of the tray contain in their exposed portions, perforations 32 which are preferably elliptical in form to provide neat-appearing ventilating means for the tray and further to make it possible to brush out through them, any dirt or dust that may accumulate in the tray.

Referring to Fig. 5, the tray has cross partitions 33 that project between the channel members 6, 6, from one side member 27 of the tray to the other side member 27 thereof. On the outside faces of the side members 27, opposite the ends of the partitions 33, there are secured flat pieces 34 by rivets 35 which pass through said side members into short channel pieces 36 which receive on one flanged side the right-angled tongue portion 37 of the partition end, and on the other flanged side the two right-angled ear portions 38, 38, that project in the opposite direction from said partition end. These tongue and ear projections on the partition ends, slide easily into the channel pieces 36 to facilitate the initial assembly of the tray as well as to make the removal and insertion of a partition an easy operation. (See Figs. 5, 6 and 7.)

Surrounding the channel members 6, 6, one on each side of a partition 33 that passes between them, is a short channel member 39 to whose back portion is riveted a flanged piece 40 similar to the channel piece 36. These flanged pieces 40 receive the tongue portions 41 and 42 of longitudinal partitions 43 that are shorter than, though similar in construction to, the cross partitions 33. The partitions 43 are disposed in an approximately straight line through the middle portion of the tray, and divide, together with the cross partitions 33, the tray into the number of compartments desired. Since no bolts or rivets are employed in securing these partitions in place, their removal and insertion is an easy operation.

Above the lower tray is mounted a second tray 45, which is preferably smaller than the first and supported as follows. Referring to Figs. 12, 13, 14 and 24, an inverted-arch shaped bracing member 46 has its lower middle portion firmly bolted between a respective pair of channel members 6, 6, and its two upper ends bolted between a respective pair of cross supporting bars 47 that pass between, and are supported by, said channel members 6, 6. Bolted between the middle channel members 6, 6, is a horizontal bracing member 47ª, similar to the horizontal member 9. The cross supporting bars 47, braced by the inverted-arch shaped members 46, form a strong support for the second tray 45 which is smaller than, though similar to the tray below it. (See Figs. 1, 2 and 24).

The numeral 48 designates a top shelf that is made tiltable as follows. Referring to Figs. 2, 19 and 20, there is bolted between each pair of channel members 6, 6, the lower middle portion of an inverted-arch shaped bracing member 49 whose upper ends are bolted between a respective pair of cross members 50, 50, that are bent outwardly at their middle portions to straddle the channel members 6, 6, instead of passing between them, for a purpose to be hereinafter described. The ends of the bracing members 49, 49, on one side of the channel members 6, 6, project upwardly a sufficient distance to permit the ends of a pair of cross members 51, 51, to be hingedly secured thereto by a bolt 52. To the cross members 51, 51, on each side of the rack, the top shelf 48 is secured. The latter is constructed of two pieces of sheet metal formed and riveted together as shown in Figs. 21 and 22, to provide beveled marginal edges that surround a flat top surface.

Hingedly secured between the front ends of each pair of cross members 51, 51, is a notched curved piece 52ª whose free end is vertically movable between the front ends of its respective pair of cross members 50, 50. Projecting between the ends of the cross members 50, 50, of each pair, is a bolt 53 whose shank the notches in the curved piece 52 are adapted to engage to hold the shelf 48 in a desired tilted position. By means of the structure just described, it is easily possible to tilt the shelf 48 to a desired angular position.

For the purpose of supporting bananas above the shelf 48, the following means are provided. Referring to Fig. 18 it will be seen that the upper ends of the channel members 6, 6, may be drawn toward each other by bolts 54, 54, that pass through the enlarged portions of the cross members 50, 50. Adapted to be passed through a slot 55ª in the shelf 48, downwardly between the channel members 6, 6, of each pair of the latter, is a bar 55 which is adapted to be firmly gripped and held by said members when nuts 56 on the ends of the bolts 54, 54, are tightened. When the tilting shelf 48 is used, the cross members 51, 51, are widened at their middle portions to permit the bar 55 to pass downwardly between them. (See Fig. 19).

The upper end of the bar 55 is adapted to project into the tubular lower end of a casting 57 that preferably has four outwardly projecting wing portions 58 on the top of each of which is a boss 59 containing a hole 60. Two of these wing portions 58 raise their bosses to a level above the other two, to permit the two pairs of supporting arms to cross each other. The shorter pair of these arms, which cross the lower pair, is designated by the numeral 61, while the lower pair that extends lengthwise of the rack, is designated by the numeral 62. Referring to Figs. 15 and 25, the cross arms 61 straddle and are firmly bolted to the two oppositely disposed upper bosses 59 on the wing portions 58 of the casting 57, while the longitudinal arms 62 straddle and are firmly bolted to the two oppositely disposed lower bosses 59 on the wing portions of said casting.

Secured between the outer ends of each pair of supporting arms 61 and 62, is the upper end of a hook 63 that is firmly clamped between said arms by a screw bolt 64 that passes through the outer ends of said arms and receives on its outer end a nut 65. Each hook 63 has an enlarged head portion 66 that rests upon the top edges of its respective supporting arms, while on its lower end a bunch of bananas is adapted to be suspended. If it is not desired to use the banana supporting construction just described, it may be readily removed from the rack by lifting the castings 57 from the bars 55 and removing the latter from the sockets which the channel members 6, 6, form for them.

Having described my invention, I claim:

1. In a display rack, a pair of horizontal base members, a pair of vertically-disposed channel members secured to the middle portion of each base member, a horizontal bracing bar projecting through said channel members at right angles to said horizontal base members, an arch-shaped member secured to each base member, and whose upper portion projects between the channel members secured to the latter, above the horizontal bracing bar, and bowed basket holding bands secured between the arch-shaped members and the horizontal bracing bar.

2. In a display rack, a pair of horizontal base members, a pair of vertically-disposed channel members secured to the middle portion of each base member, a horizontal bracing bar projecting through said channel members at right angles to said horizontal base members, an arch-shaped member secured to each base member, and whose upper portion projects between the channel members secured to the latter, above the horizontal bracing bar, two vertical bars secured to each base member, one on each side of its respective pair of channel members, and bowed basket holding bands secured between the horizontal bracing bar, the vertical bars and arch-shaped members.

3. In a display rack, a pair of horizontal base members, each base member consisting of two angle-irons so connected as to have two corresponding sides thereof face each other in a vertical position, a roller at each end of said base members, a pair of channel members whose lower ends straddle, and are secured to, the middle portions of the upwardly projecting sides of each pair of angle irons, an arch-shaped member whose lower ends are firmly secured between the upturned sides of each pair of angle irons, the top portion of said arch-shaped member passing between the channel members, a pair of vertical bars whose lower ends are firmly secured between the upturned sides of each pair of angle irons, one bar on each side of said channel members, a horizontal bracing member projecting through said channel members at right angles to the base members, and basket holding bands secured between said horizontal bracing member, the vertical bars and the arch-shaped members.

4. In a display rack, a pair of horizontal base members, a pair of horizontal bracing elements which cross each other at their middle portions, secured between said horizontal base members, a standard secured to the middle portion of each base member, a horizontal bracing bar secured to said standards, at right angles to the base members, an arch-shaped bracing member secured to each horizontal base member and whose top portion is connected to the standard on the latter, a vertical bar secured near each end of each base member, and a series of basket holding bands, each of which is connected at one end to the horizontal bracing bar near the said standard, and then again to said bracing bar at a short distance beyond its first point of connection thereto, after which it is bowed outwardly and then inwardly to a vertical bar, to which it is connected, and thence projecting inwardly to the arch-shaped member to whose upper portion it is secured.

5. In a display rack, a pair of horizontal base members, a standard secured to the middle portion of each base member, a horizontal member secured between said standards, an auxiliary horizontal member secured to each standard and projecting outwardly therefrom in approximately the same line as the first horizontal member, an arch-shaped bracing member secured to each horizontal base member and whose top portion is connected to the standard on said base member, a vertical bar secured to each base member near each end of the latter, cross supports secured between said standards and the tops of said bars, and a tray supported by the horizontal members and cross supports.

6. In a display rack, a pair of horizontal base members, a pair of vertically-disposed channel members secured to the middle portion of each base member, an arch-shaped bracing member secured to each base member, and whose upper portion projects between the channel members secured to the latter, two vertical bars secured to each base member, one on each side of its respective pair of channel members, a horizontal member projecting longitudinally between the upper portions of the two pairs of channel members, an auxiliary horizontal member projecting outwardly from each pair of channel members, in approximately the same line as the first named horizontal member, cross supports whose middle portions are connected between the channel members of each pair of the latter, the cross supports being secured to the upper ends of the vertical bars, and a tray supported by the longitudinal members and cross supports.

7. In a display rack, a pair of horizontal base members, a pair of vertically-disposed channel members secured to the middle portion of each base member, an arch-shaped bracing member secured to each base member, and whose upper portion projects between the channel members secured to the latter, a horizontal bracing bar projecting through said channel members at right angles to the base members, two vertical bars secured to each base member, one on each side of its respective pair of channel members, a horizontal member projecting longitudinally between the upper portions of the two pairs of channel members, an auxiliary horizontal member projecting outwardly from each pair of channel members, in approximately the same line as the first named horizontal member, cross supports whose middle portions are connected between the channel members of each pair of the latter, the cross supports being connected to the upper ends of the vertical bars, a suspension bar secured between each outer end of the horizontal bracing bar and each auxiliary longitudinal horizontal member, vertically-disposed bracing members that cross each other at their middle portions connected between the channel members in the space between the horizontal bracing member and the middle longitudinal member above it, and a tray supported by the longitudinal horizontal members and cross supports.

8. In a display rack, a pair of horizontal base members, a standard secured to the middle portion of each base member, a horizontal member projecting longitudinally from the upper portion of each standard, a pair of vertical bars secured to each base member, one on each side of the standard mounted thereon, cross supports secured between said standards and the said vertical bars, angular end portions on the horizontal members and cross supports, a receptacle, and a downwardly projecting flange on said receptacle, secured to the angular end portions of the horizontal members and cross supports.

9. In a tray for a display rack, the combination with a bottom for said tray, of a downwardly projecting flange on said bottom, a marginal piece having a horizontal portion below a portion of said bottom, said marginal piece being bent to form a grooved front end to receive the flange on said bottom, and a vertical face member for said tray supported in said groove between said bottom flange and the upturned front portion of the marginal piece.

10. In a tray for a display rack, the combination with a bottom for said tray, of a downwardly projecting flange on said bottom, a marginal piece having a horizontal portion below a portion of said bottom, said marginal piece being bent to form a grooved front end to receive the flange on said bottom, side and end members for said tray supported in said grooves, and angular corner pieces adapted to fit against the meeting edges of the side and end members, the lower ends of said corner pieces being bent to hook under the marginal pieces, while the upper ends of said corner pieces are formed to pass through slots in the upper marginal portions of the side and end members, and adapted to be turned down against the inside faces of the latter.

11. In a tray for a display rack, the combination with side and end members, and a bottom for said tray, of oppositely disposed channel pieces secured to the side members of said tray, a series of cross partitions for the latter, a central right-angled tongue on each end of a cross partition, and two ear portions turned in the opposite direction from said tongue portion, one on each side of said tongue portion, on each end of a partition, said tongue and ear portions on the partitions adapted to be readily received by the channel pieces on the side members, removably to hold the partitions in the tray.

12. In a display rack, a pair of horizontal base members, a pair of channel members secured to the middle portion of each base member, a tray through whose bottom said channel members project upwardly, supporting means on said base members coöperating with the channel members for holding said tray, cross partitions in said tray whose middle portions pass between the channel members, a channel piece having a double flange on its back portion to fit a respective channel member, said channel pieces being applied to the channel members on each side of the cross partitions that pass between them, and longitudinal partitions having tongue portions that fit in said channel pieces, to divide, with the cross partitions, the tray into separate compartments.

13. In a display rack, a pair of horizontal base members, a pair of channel members secured to the middle portion of each base member, an inverted-arch shaped bracing member whose lower portion is secured between the top portions of each pair of channel members, a pair of cross supporting bars whose middle portions project between each pair of channel members, and between which the upper ends of the arch-shaped bracing members are secured, and a receptacle supported by said cross bars.

14. In a display rack, a pair of horizontal base members, a pair of channel members secured to the middle portion of each base member, a pair of cross members secured to the top end of each pair of channel members, the middle portions of said cross members being widened to straddle their respective channel members, bolts passing through the widened portions of the cross members, a vertical bar adapted to be received between the top ends of each pair of channel members, a banana supporting frame mounted on each vertical bar, and nuts adapted to be applied to said bolts to draw the top ends of the channel members tightly against the vertical bar, firmly to support it in an adjusted position.

15. In a display rack, a pair of horizontal base members, a pair of channel members secured to the middle portion of each base member, a pair of cross members secured to the top end of each pair of channel members, a display device mounted on said cross members, the middle portions of the latter being widened to straddle their respective channel members, bolts passing through the widened portions of said members, a vertical bar adapted to be received between the top ends of each pair of channel members, after being projected through a hole in the bottom of said display device, a tubular casting adapted to be slipped on said vertical bar, banana supporting arms secured to said casting, and nuts adapted to be applied to said bolts to draw the top ends of the channel members tightly against the vertical bars, firmly to support them, and through them, the banana holding arms.

16. In a display rack, a pair of horizontal base members, a pair of channel members secured to the middle portion of each base member, a vertical bar removably supported between the upper ends of each pair of channel members, a tubular casting having pairs of outwardly projecting wings, adapted to be placed on the upper end of said bar, a boss on the top of each wing, one pair of bosses being on a higher level than the other pair, a pair of cross arms secured to the lower pair of bosses, a second pair of cross arms at right angles to the first pair, secured to the upper pair of bosses, and a banana-bunch supporting hook secured between the outer ends of each pair of cross bars.

In testimony whereof I have hereunto set my hand this 12th day of July, 1919.

BENEDICT E. WILLETT.

Witness:
HOWARD S. SMITH.